United States Patent
Wang

(10) Patent No.: US 8,430,525 B2
(45) Date of Patent: Apr. 30, 2013

(54) ILLUMINATION ASSEMBLY FOR SHOP ILLUMINATION

(75) Inventor: Lingli Wang, Bad Kreuznach (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 781 days.

(21) Appl. No.: 12/599,330

(22) PCT Filed: May 8, 2008

(86) PCT No.: PCT/IB2008/051799
§ 371 (c)(1),
(2), (4) Date: Nov. 9, 2009

(87) PCT Pub. No.: WO2008/139381
PCT Pub. Date: Nov. 20, 2008

(65) Prior Publication Data
US 2010/0299983 A1 Dec. 2, 2010

(30) Foreign Application Priority Data
May 10, 2007 (EP) .................................. 07107921

(51) Int. Cl.
*F21V 13/00* (2006.01)

(52) U.S. Cl.
USPC ............ 362/243; 40/553; 40/582; 362/23.07; 362/125; 362/343; 362/812

(58) Field of Classification Search ................... 40/553, 40/554, 557, 582, 583; 362/29, 30, 125, 362/143, 243, 307, 327, 343, 604, 605, 812
See application file for complete search history.

(56) References Cited

U.S. PATENT DOCUMENTS
4,307,528 A * 12/1981 Dewees et al. ................. 40/582

FOREIGN PATENT DOCUMENTS
GB 2411512 A 8/2005
JP 2005268068 A 9/2005
JP 2006071690 A 3/2006

* cited by examiner

*Primary Examiner* — Stephen F Husar
(74) *Attorney, Agent, or Firm* — Mark L. Beloborodov

(57) ABSTRACT

For illuminating an object and generating a light image, e.g. for presentation of the object, an illumination assembly comprises a reflective part for illumination and a diffractive part for generating the light image. A light source such as a LED light source is used for generating the light.

7 Claims, 4 Drawing Sheets

ILLUMINATION ASSEMBLY FOR SHOP ILLUMINATION

FIELD OF THE INVENTION

The present invention relates to an illumination assembly for illuminating an object.

BACKGROUND OF THE INVENTION

In a shop, products are stacked in a rack, or the like, and presented to a customer. In order to attract the attention of the customer, the products should be clearly visible. Further, preferably, also other signs are provided for attracting the attention of the customer. Such a sign may provide information about the product, the price of the product or other relevant information, for example.

In JP2006071690 it is described to use an image-creating body and a light emitting diode (LED) to project a light image on a first side of a translucent screen, thereby generating a shadow image on a second side of the translucent screen. Thus, using a text, a brand mark or the like may be shown as a light image.

OBJECT OF THE INVENTION

It is an object of the present invention to provide an illumination system for illuminating an object and for generating a light image.

SUMMARY OF THE INVENTION

The object is achieved in an illumination assembly according to claim 1. The illumination system comprises at least one light source, such as a LED, for generating light. The light source is arranged such that a part of the generated light is directed at a reflective part of the illumination assembly. The reflective part is arranged and configured to illuminate the object, such as an article for sale or a wall. Further, the light source is arranged such that another part of the generated light is directed at a diffractive part. The diffractive part is configured to shape a distribution of the light, thereby generating a light image.

The reflective part may comprise a reflector to reflect the light generated by the light source and/or the reflective part may comprise a diffractive reflective part to re-direct the light. For example, a diffractive reflective part may be used to generate a light spot directed at a particular product on a shelf.

In an embodiment, the reflective part may comprise a second light source. The second light source may be, for example, a reflective OLED (organic light emitting diode), thereby generating more light and illuminating the object even more.

The diffractive part may comprise a transmissive diffractive element such that light generated by the light source may pass through the diffractive element. A person positioned on a side of the diffractive element opposite of said element compared to the light source may perceive a three-dimensional image, when looking at the diffractive element.

The diffractive part may comprise a reflective diffractive element for generating a three-dimensional light image on the object. The object may be, for example, a wall. As mentioned above, it may also be used for highlighting a product on a shelf, or the like.

BRIEF DESCRIPTION OF THE DRAWINGS

Hereinafter, the present invention is elucidated with reference to the appended drawings showing non-limiting embodiments, wherein.

DETAILED DESCRIPTION OF EXAMPLES

Figure 1:
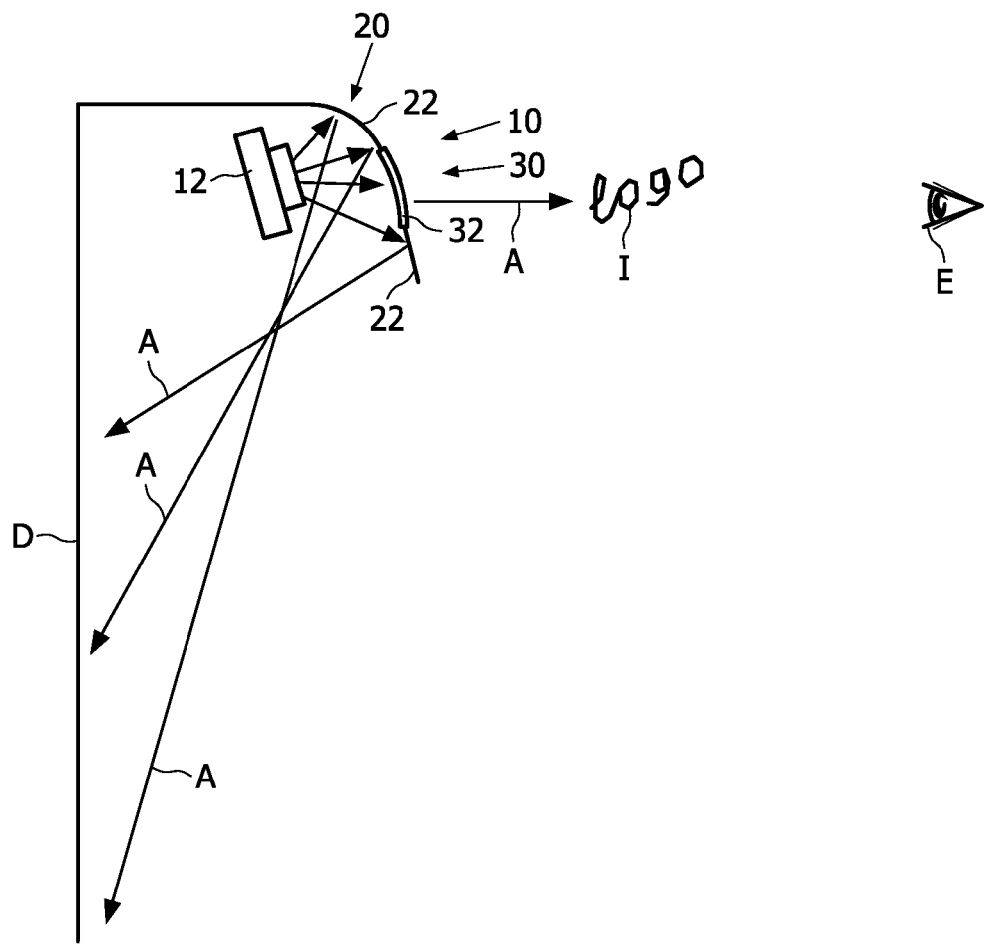
FIG. 1 shows a first embodiment of an illumination assembly according to the present invention.

In the drawings, same reference numerals refer to same elements. FIG. 1 shows an illumination assembly 10 arranged relative to a display D of products. The products are arranged on shelves, for example. The illumination assembly 10 comprises a light source 12, for example a LED light source, for generating light. The illumination assembly 10 further comprises a reflective part 20 comprising a reflector 22 and a diffractive part 30 comprising a transmissive diffractive element 32. Further, an eye E of a person, e.g. a customer, is shown. Also, an image I is shown. The image I is a virtual image that may be perceived by the person, as is elucidated below. Arrows A represent exemplary light ray trajectories.

In operation, the illumination assembly 10 illuminates the products on the display D. To achieve this, the light generated by the light source 12 is reflected by the reflector 22. The reflector 22 is shaped such that substantially the whole display D, or a predetermined part thereof, is illuminated as illustrated by the arrows A. Further, a part of the generated light passes through the transmissive diffractive element 32. A part of said light reaches the eye E and the image I is perceived by the person. The image I may be a three-dimensional image of a logo, a brand name, a trademark or any other sign, for example.

Figure 2:
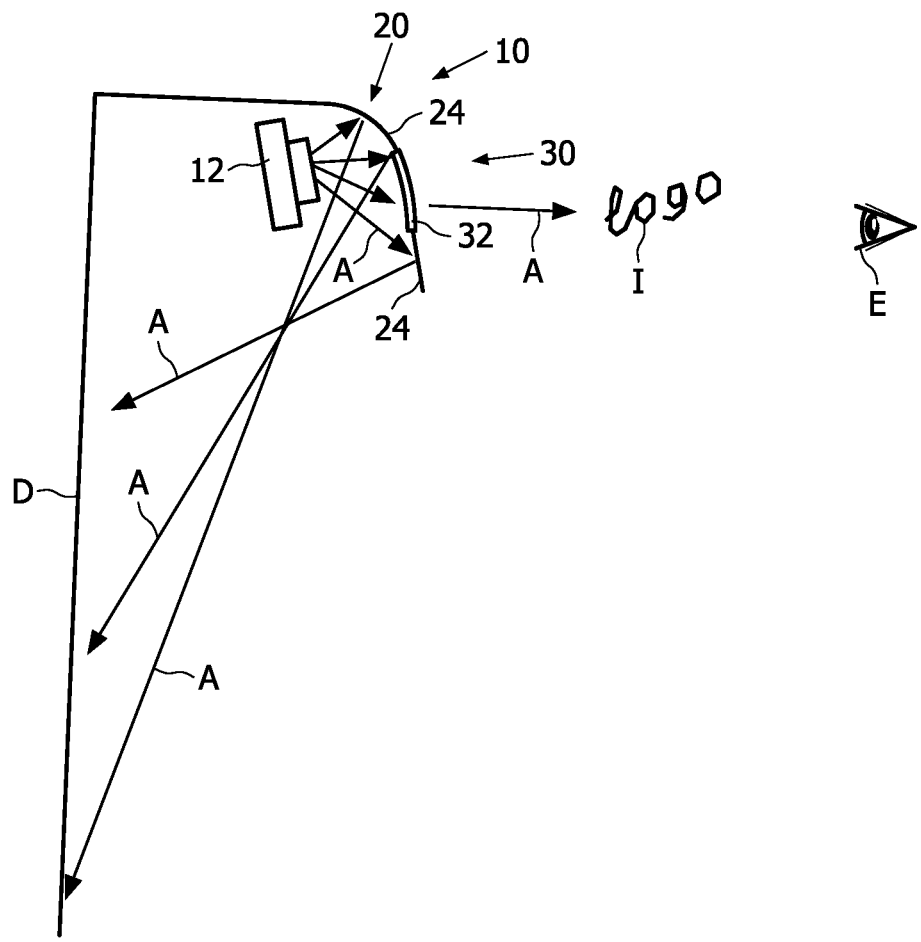
FIG. 2 shows a second embodiment of an illumination assembly according to the present invention.

FIG. 2 shows a second embodiment of the illumination assembly 10. Compared to the first embodiment illustrated in FIG. 1, the reflective part of the second embodiment is provided with a diffractive reflective element 24. The diffractive reflective element 24 may replace the reflector 22 or may be used in combination with the reflector 22. The diffractive reflective element 24 enables more accurate shaping of the reflected light and thus the illumination of the display D.

Figure 3:
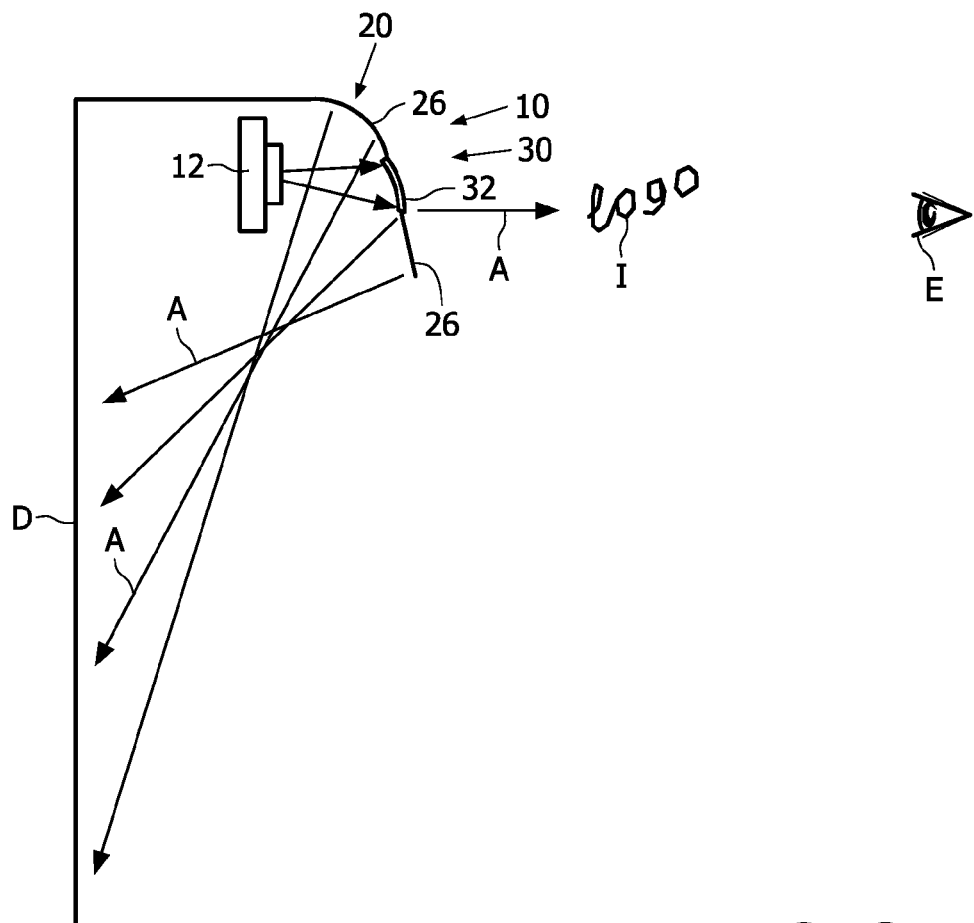
FIG. 3 shows a third embodiment of an illumination assembly according to the present invention.

FIG. 3 shows a third embodiment of the illumination assembly 10. Compared to the first embodiment illustrated in FIG. 1, the reflective part of the third embodiment is provided with a reflective organic light emitting diode (OLED) 26, or a number of OLEDs 26. The OLEDs 26 generate additional light, thereby enabling better illumination of the display D. Moreover, since the display D receives light from the OLEDs 26, the first light source 12 may transmit more light through the diffractive element 32, thereby obtaining a brighter image I. The reflective OLEDs 26 may be used instead of, or in combination with, the reflector 22 and/or the diffractive reflective element 24.

Figure 4:
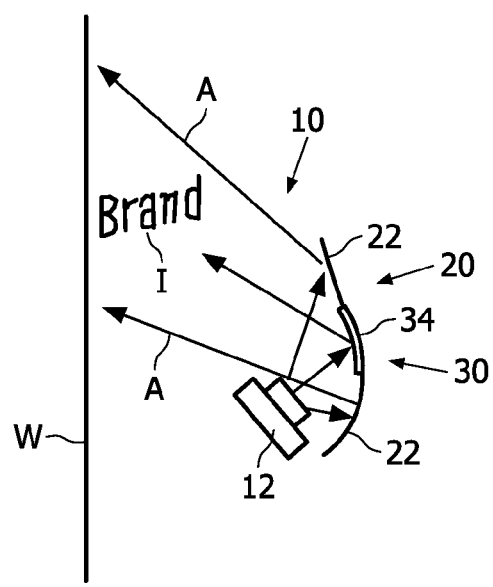
FIG. 4 shows a fourth embodiment of an illumination assembly according to the present invention.

FIG. 4 shows a fourth embodiment of an illumination assembly 10. The illumination assembly 10 is configured to illuminate a wall W and to project an image I on the wall W. Of course, the wall W may as well be a display D, or the like. In the fourth embodiment, a suitably shaped reflector 22 is used to illuminate the wall W. A reflective diffractive element 34 is used to generate the image I on the wall W.

Figure 5:
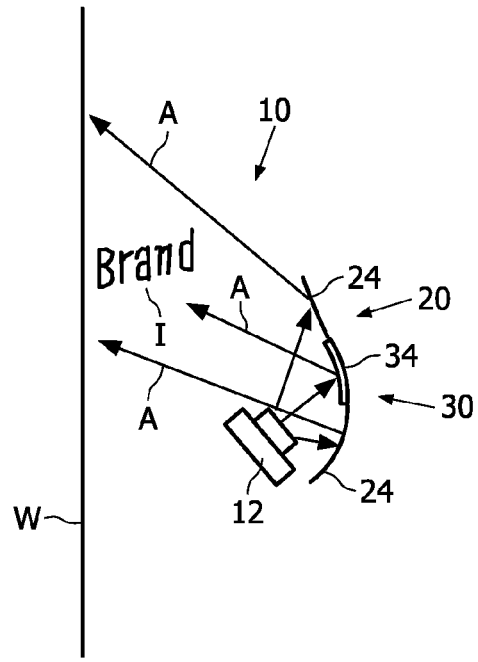
FIG. 5 shows a fifth embodiment of an illumination assembly according to the present invention.
Figure 6:
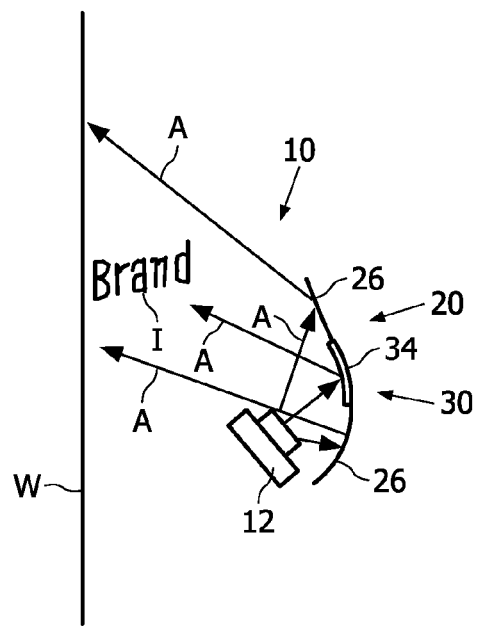
FIG. 6 shows a sixth embodiment of an illumination assembly according to the present invention.

FIG. 5 shows a fifth embodiment of the illumination assembly 10. Compared to the fourth embodiment, the reflective part 20 comprises a reflective diffractive element 24 instead of, or in combination with, the reflector 22. As illustrated in FIG. 6, the reflective part 20 may further comprise a reflective OLED 26, or a number of reflective OLEDs 26.

Although detailed embodiments of the present invention are disclosed herein, it is to be understood that the disclosed embodiments are merely exemplary embodiments of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting, but rather to provide an understandable description of the invention. The terms "a" or "an", as used herein, are defined as one or more than one. The term another, as used herein, is defined as at least a second or more. The terms including and/or having, as used herein, are defined as comprising (i.e., open language).

The invention claimed is:

1. Illumination assembly for illuminating an object and for generating a light image, the illumination assembly comprising:
   a first light source for generating light;
   a reflective part arranged relative to the light source such that light generated by the first light source is reflected towards the object for illuminating the object; and
   a diffractive part arranged relative to the light source such that light generated by the first light source generates the light image, wherein said reflective part comprises a second light source comprising a reflective organic light emitting diode.

2. Illumination assembly according to claim 1, wherein the reflective part comprises a reflector.

3. Illumination assembly according to claim 1, wherein the reflective part comprises a reflective diffractive element.

4. Illumination assembly according to claim 1, wherein the diffractive part comprises a transmissive diffractive element.

5. Illumination assembly according to claim 4, wherein first light source is arranged on a first side of the transmissive diffractive element and wherein the transmissive diffractive element is configured to generate a three-dimensional light image on a second side of the transmissive diffractive element.

6. Illumination assembly according to claim 1, wherein the diffractive part comprises a reflective diffractive element.

7. Illumination assembly for illuminating an object and for generating a light image, the illumination assembly comprising:
   a light source for generating light;
   a reflective part arranged relative to the light source such that light generated by the light source is reflected towards the object for illuminating the object; and
   a diffractive part arranged relative to the light source such that light generated by the light source generates the light image, wherein the diffractive part comprises a transmissive diffractive element, wherein the light source is arranged on a first side of the transmissive diffractive element and wherein the transmissive diffractive element is configured to generate a three-dimensional light image on a second side of the transmissive diffractive element.

* * * * *